United States Patent [19]
Goldan

[11] 3,715,755
[45] Feb. 6, 1973

[54] REPETITIVE PULSE GENERATING SYSTEM

[75] Inventor: Theodore J. Goldan, Nutley, N.J.

[73] Assignee: International Telephone and Telegraph Corporation, Nutley, N.J.

[22] Filed: Sept. 10, 1957

[21] Appl. No.: 683,186

[52] U.S. Cl. ................ 343/18 E, 328/38, 328/56
[51] Int. Cl. ................................................ H04k 3/00
[58] Field of Search ........ 343/101, 6.8, 18 E; 328/38, 328/56

[56] References Cited

UNITED STATES PATENTS 2,978,699   4/1961   Dodington .................... 343/18 E Primary Examiner—Benjamin A. Borchelt
Assistant Examiner—Richard E. Berger
Attorney—Percy P. Lantzy

[57] ABSTRACT

A received pulse produces a plurality of delayed similar pulses by stretching the received pulse and heterodyning it against a swept oscillator derived pulse to obtain a multifrequency pulse at lower frequency. This pulse recirculated through a delay unit and the plurality of successive pulses so produced are heterodyned against the multifrequency source to convert them to the original frequency.

9 Claims, 2 Drawing Figures

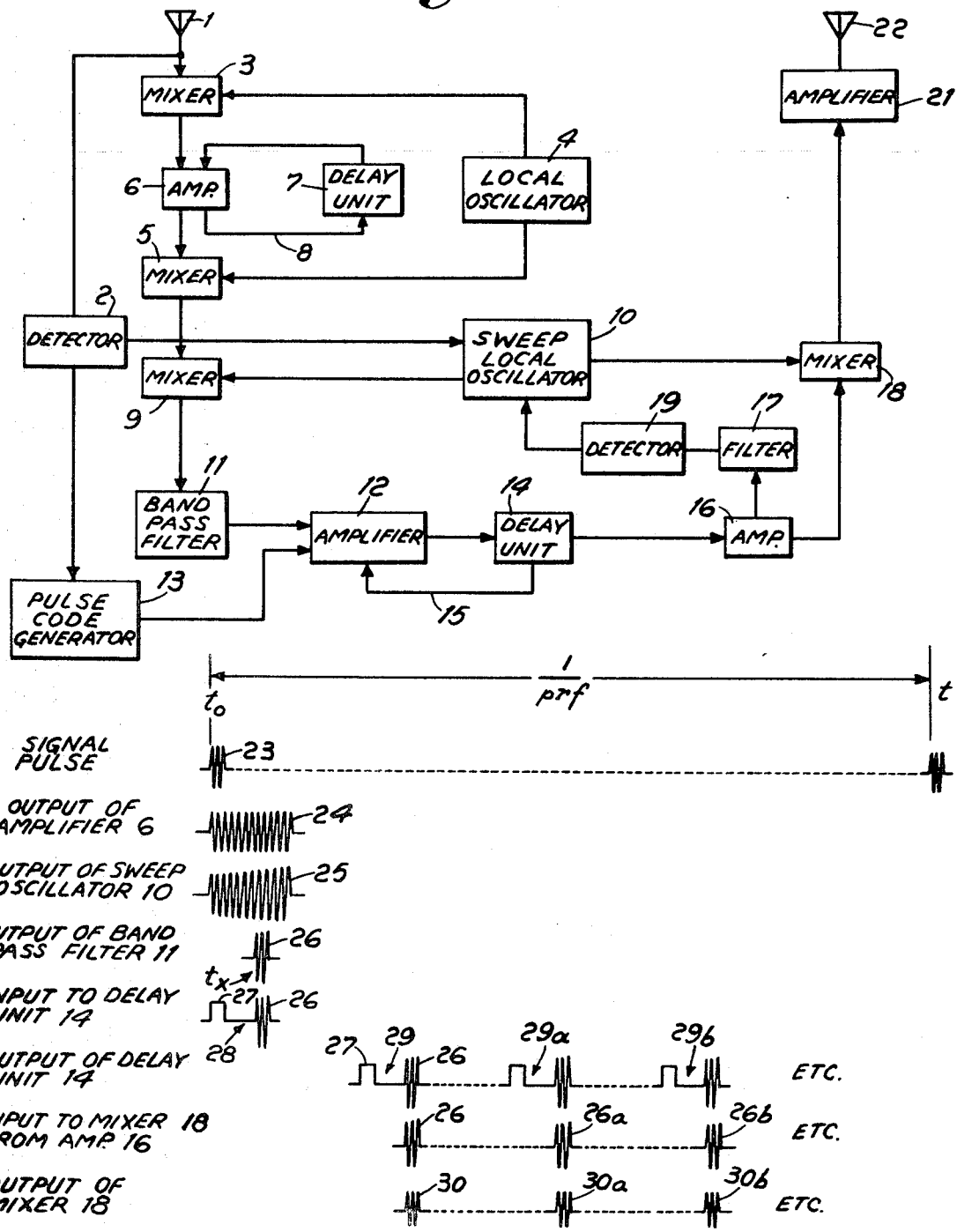

REPETITIVE PULSE GENERATING SYSTEM

This invention relates to radio repeaters and more particularly to repetitive pulse generating systems.

Pulse repeating systems have been devised to accomplish, among other objects, the deception of enemy radar or radio location devices through the introduction of spurious targets. The false targets so generated are intended to produce confusion due to their erroneous direction, distance and numerical strength. It is desirable to have a system for generating repetitive pulses of such strength and time delay that they will appear to the enemy to be true reflections from targets such as ships and aircraft. It is essential, therefore, for the successful performance of such a deception system that the delayed transmitted pulses be of the same frequency and substantially the same pulse width as the original received pulse.

It is an object of this invention to provide an improved system for generating repetitive radio frequency pulses derived from a single radio frequency pulse.

It is a further object to provide a pulse repetitive generating system that in response to received radio pulses will generate delayed pulses of the same frequency and of substantially the same pulse width and transmit these delayed pulses.

A feature of this invention is a repetitive pulse generating system wherein a received pulse of a given frequency is stretched to at least a minimum pulse width equal to a multiple of the received pulse and is then heterodyned against a swept oscillator frequency having the pulse width at least equal to the minimum width of the stretched pulse. A multifrequency pulse of the same width as the received pulse is obtained and is then recirculated through a delay unit and sampled after each circulation to obtain a train of multifrequency pulses delayed in time with respect to each other and the first multifrequency pulse. The delayed multifrequency pulses are then heterodyned against the swept oscillator pulses to obtain therefrom a train of pulses of the original frequency and width but delayed in time from the original pulse.

Another feature is the generation of a timing code pulse derived from the received pulse together with the multifrequency pulse to constitute a time code whereby the frequency of a received pulse is reconstituted into a delayed series of transmitted pulses.

The above-mentioned and other objects and features of this invention and the manner of attaining them will become more apparent by reference to the following description taken in conjunction with the drawings, of which:

FIG. 1 is a block diagram according to the principles of this invention; and

FIG. 2 is a graphical illustration used in explaining the operation of this invention.

Referring now to FIG. 1, there is shown an antenna 1 of a radio receiver coupled to a detector 2 and a mixer 3. A local oscillator 4 is coupled to the mixer 3 and a mixer 5 whereby the received signal pulse is first heterodyned down in frequency at 3 and then heterodyned up again at 5 to the original frequency. The down frequency output of mixer 3 is fed into an amplifier 6. A delay unit 7 is coupled to the output and the input of the amplifier 6, and these units comprise a feedback signal storage loop 8. The output of the amplifier 6 is sampled off and fed into the mixer 5. A mixer 9 receives the high frequency output of mixer 5 and the output of a known sweep local oscillator 10 which generates a pulse containing a band of sequentially different frequencies. The output of detector 2 is fed into the sweep oscillator 10 for triggering purposes. The output signal of the mixer 9 is then injected into a band pass filter 11 and thence to an amplifier 12. The output of the detector 2 is also fed into a pulse code generator 13 which develops a timing code pulse 27, FIG. 2, in response thereto. Amplifier 12 is coupled to the input of a delay unit 14. The output of the delay unit 14 is coupled to the input of amplifier 12 and to the input of an amplifier 16. The amplifier 12 and the delay unit 14 comprise a delay loop or feedback signal storage loop 15. The output of amplifier 16 is fed to a filter 17 and a mixer 18 to which is also coupled the output of the sweep oscillator 10. The output of filter 17 is fed to a detector 19, and the output of detector 19 is injected into the sweep oscillator 10 where it triggers the start of the swept oscillator pulse which is fed into the mixer 18. Amplifier 21 amplifies the output of mixer 18 and applies it to the antenna 22.

In operation, a radio frequency signal pulse 23, shown in FIG. 2, is received by the antenna 1 and fed into the detector 2 and the mixer 3. The detector 2 develops a video pulse which when fed into the sweep oscillator 10 will trigger the sweep oscillator to generate a swept radio frequency signal. The signal pulse 23 goes to the mixer 3 where it is heterodyned down by the oscillator output of local oscillator 4 to a lower frequency wherein the feedback loop 8 operates. The signal output of mixer 3 is then fed into the amplifier 6, and at the output amplifier 6 a portion of the signal energy is extracted or sampled and the remainder is recirculated through the feedback loop 8. The delay unit 7 has a delay time equal to the pulse width of the pulse 23. At the end of each circulation a portion of the circulated pulse is sampled and fed in the mixer 5 where it is heterodyned up to the original frequency of pulse 23. This process continues for a minimum number of recirculating trips, and the sampled pulses will be added to each other until a stretched pulse of a minimum width is obtained which is equal to a multiple of the pulse 23 width determined by the number of recirculating trips. The feedback loop 8 is so designed that the minimum number of recirculated replicas of the signal pulse will be delivered before the signal disappears in the loop noise. The stretched pulse output of amplifier 6 is shown as pulse 24.

The sweep oscillator 10 develops a swept radio frequency signal 25, when triggered by the video pulse output of detector 2, that sweeps over a band of frequencies in the same time as the minimum pulse width of the stretched pulse 24. This swept radio frequency pulse 25 is injected into the mixer 9 at the same time that the stretched pulse 24 is being injected. No signals will move through the pass band filter 11 except for the period of time after the start of the swept pulse 25 when the difference signals between the stretched pulse 24 and the swept pulse 25 is equal to the filter 11 pass band, and will occur at a time $t_x$ after the receipt of the signal pulse 23. This difference multifrequency signal is shown as a pulse 26, and its width is equal to the width of the signal pulse 23. This multifrequency signal 26 is injected into the amplifier 12 and the feedback loop 15, which has a delay time much longer than the time interval from $t_o$ to $t_x$. The feedback loop 15 now contains two signals. At time $t = o$ a timing code pulse 27 of a fixed frequency, the output of the pulse code generator, was injected into amplifier 12; at time $t = x$ the swept signal pulse 26 enters the amplifier 12. These two signals constitute a pulse pair 28 and together with their time separation establish a code which defines the frequency of the input signal 23. Further, the width (in time) of the swept signal pulse 26 is also the width of the input signal 23.

The timing code pulse 27 and the following swept pulse 26 recirculate in the feedback loop 15 until the loop attenuation reduces their signal levels to the loop noise. In addition to recirculating, these two pulses propagate in the direction of amplifier 16 on each round trip. Pulse pairs 29, 29a and 29b, etc., show the relative position of the delayed pulse pairs with respect to the original pulse pair 28. It is to be understood, however, that the spacing between the pulses is for purposes of illustration only and indicative of a delay between successive pulse pairs and does not necessarily represent the precise interval of delay that is secured. The timing code pulse 27 and multifrequency swept pulse 26 are separated from each other by the filter 17 so that only the delayed swept multifrequency pulses 26, 26a, 26b, etc., enter the mixer 18. The output of the detector 19 triggers the sweep oscillator 10 to start its sweep. Since the timing code pulse 27 precedes the swept oscillator pulse 26, the sweep oscillator 10 will be sweeping through that frequency at the instant when the swept pulse emerges from the amplifier 16. Since the two pulses, the swept oscillator pulse 25 and the swept multifrequency pulse 26, are sweeping upward at the same rate, the difference frequency between the two is constant with time and the output of the mixer 18 will be a single frequency pulse 30 of the same width as the swept frequency pulse 26 and occupying the same time position. The delayed pulses 30, 30a, 30b, etc., being of the same high frequency as the received pulse 23, are amplified in amplifier 21 and radiated by way of antenna 22.

While I have described above the principles of my invention in connection with specific apparatus, it is to be clearly understood that this description is made only by way of example and not as a limitation to the scope of my invention as set forth in the objects thereof and in the accompanying claims.

I claim:

1. A repetitive pulse generating system for deriving a plurality of radio frequency pulses corresponding in frequency to that of a given radio frequency pulse, but delayed in time with respect to each other and said given pulse, comprising a source of said given pulses, means to derive from a given pulse of said source a first multifrequency pulse of a given bandwidth, means to derive from said first multifrequency pulse a plurality of multifrequency pulses, each of said multifrequency pulses having the same band of frequencies as said first multifrequency pulse but delayed in time with respect to each other and said first multifrequency pulse, and means to derive from each of said delayed multifrequency pulses a pulse of frequency corresponding to the frequency of said given pulse but delayed in time with respect to said given pulse in accordance with the timing of the multifrequency pulse from which it was derived.

2. A repetitive pulse generating system for deriving a plurality of radio frequency pulses corresponding in frequency to the given frequency of a given radio frequency pulse, each of said plurality of pulses being delayed in time with respect to each other, comprising a source of said given pulses, means to stretch a given pulse of said source to a given width, oscillator means to generate a pulse of undulations of sequentially different frequencies and having the same pulse width as said given width, means responsive to said given pulse to synchronize said oscillator to produce an oscillator pulse having a leading edge in coincidence with the leading edge of said stretched pulse, means to combine said stretched pulse with said oscillator pulse to obtain a first multifrequency pulse of a given bandwidth and having a pulse width equal to the width of said given pulse, means to derive from said multifrequency pulse a plurality of multifrequency pulses, each of said multifrequency pulses having the same band of frequencies as said first multifrequency pulse but delayed in time with respect to each other and said first multifrequency pulse, and means to derive from each of said delayed multifrequency pulses a pulse of said given frequency delayed in time with respect to said given pulse in accordance with the timing of the multifrequency pulses from which it was derived.

3. A repetitive pulse generating system for deriving a plurality of radio frequency pulses corresponding in frequency to the given frequency of a given radio frequency pulse, each of said plurality of pulses being delayed in time with respect to each other and said given pulse, comprising a source of said given pulses, means to convert a given pulse of said source into another pulse of a lower frequency but of substantially the same pulse width as said given pulse, amplifying means to amplify said converted pulse, a delay unit adapted to operate at said lower frequency and having a delay equal to the width of said given pulse, means coupling said delay unit to the output and input of said amplifier, means to allow a portion of the energy of said converted pulse to recirculate through said delay unit and said amplifying means, means to combine said converted pulse and the recirculated portions thereof to obtain a stretched pulse of said lower frequency having a minimum pulse width equal to a multiple of the width of said given pulse depending upon the number of times of recirculation, means to convert said stretched pulse of said lower frequency into a stretched pulse of said given frequency, oscillator means to generate a pulse of undulations of sequentially different frequencies and having a pulse width as corresponding to the minimum width of said stretched pulse, means to synchronize said oscillator to produce an oscillator pulse having a leading edge in synchronism with the leading edge of said stretched pulse, means to combine said stretched pulse with said oscillator pulse to obtain a first multifrequency pulse having a width corresponding to the width of said given pulse, means to derive from said first multifrequency pulse a plurality of multifrequency pulses, each of said multifrequency pulses having the same band of frequencies as said first multifrequency pulse but consecutively delayed in time with respect to each other and said first multifrequency pulse, and means to derive from each of said delayed multifrequency pulses a pulse of said given frequency delayed in time with respect to said given pulse in accordance with the timing of the multifrequency pulse from which it was derived.

4. A repetitive pulse generating system for deriving a plurality of pulses corresponding in frequency to the frequency of a given pulse made up of undulations of a given frequency, each of said plurality of pulses being delayed in time with respect to each other, comprising a source of said given pulses, means to derive from a given pulse of said source a first multifrequency pulse of a given bandwidth and having a pulse width corresponding to the width of said given pulse, means to derive from said given pulse a timing pulse, means to combine said timing pulse with said first multifrequency pulse to form a pulse pair, first amplifying means to amplify said pulse pair, a delay unit having a delay longer than the time interval which includes said pulse pair, means to couple said delay unit to the output and input of said first amplifying means to allow a portion of the energy of said pulses to recirculate through said delay unit and said amplifying means, means to extract from the output of said delay unit a portion of the energy of the recirculated pulses to obtain sequentially spaced pulse pairs with respect to the pulse pair input, second amplifying means to amplify said output of said delay unit, oscillator means to generate an oscillator pulse of undulations of sequentially different frequencies and having a pulse width longer than the width of said multifrequency pulse, means utilizing said timing pulse to synchronize said oscillator means, and means combining said delayed multifrequency pulse with said oscillator pulse to derive therefrom a pulse of undulations of said given frequency and having a pulse width corresponding to the width of said multifrequency pulse.

5. A repetitive pulse generating system for deriving a plurality of pulses corresponding in frequency to the frequency of a given pulse made up of undulations of a given frequency, each of said plurality of pulses being delayed in time with respect to each other, comprising a source of said given pulses, means to stretch a given pulse of said source to a minimum width, oscillator means to generate a pulse of undulations of sequentially different frequencies and having the same pulse width as said minimum width of said stretched pulse, means associated with said given pulse source to synchronize said oscillator to produce an oscillator pulse having a leading edge in coincidence with the leading edge of said stretched pulse, means to combine said stretched pulse with said oscillator pulse to obtain a first multifrequency pulse of a given bandwidth and having a pulse width corresponding to the width or said given pulse, means to derive from said given pulse a timing pulse, means to combine said timing pulse with said first multifrequency pulse to form a pulse pair, first amplifying means to amplify said pulses, a delay unit having a delay longer than the time interval which includes said pulse pair, means to couple said delay unit to the output and input of said first amplifying means to allow a portion of the energy of said pulses to recirculate through said delay unit and said amplifying means, means to extract from the output of said delay unit a portion of the energy of the recirculated pulses to obtain sequentially spaced pulse pairs with respect to the pulse pair input, second amplifying means to amplify said output of said delay unit, and means combining said delayed multifrequency pulse with said oscillator pulse to derive therefrom a pulse of undulations of said given frequency only and having a pulse width corresponding to the width of said multifrequency pulse.

6. A repetitive pulse generating system for deriving a plurality of pulses corresponding in frequency to the frequency of a given pulse made up of undulations of a given frequency, each of said plurality of pulses being delayed in time with respect to each other and said given pulse, comprising a source of said given pulses, means to convert a given pulse of said source into another pulse of a lower frequency but of the same pulse width as said given pulse, first amplifying means to amplify said converted pulse, a delay unit adapted to operate at said lower frequency and having a delay equal to said width of said given pulse, means coupling said delay unit to the output and input of said first amplifier, means to allow a portion of the energy of said converted pulse to recirculate through said delay unit and said amplifying means, means to combine said converted pulse and the recirculated portions thereof to obtain a stretched pulse of said lower frequency having a minimum pulse width equal substantially to a multiple of the width of said given pulse depending upon the number of times of recirculation, means to convert said stretched pulse of said lower frequency into a stretched pulse of said given frequency, oscillator means to generate a pulse of undulations of sequentially different frequencies and having the same pulse width as the minimum width of said stretched pulse, means to synchronize said oscillator to produce an oscillator pulse having a leading edge in synchronism with the leading edge of said stretched pulse, means to combine said stretched pulse with said oscillator pulse to obtain a first multifrequency pulse having a width equal to the width of said given pulse, means to derive from said given pulse a timing pulse, means to combine said timing pulse with said first multifrequency pulse to form a pulse pair, second amplifying means to amplify said pulse pair, a delay unit having a delay longer than the time interval which includes said pulse pair, means to couple said delay unit to the output and input of said second amplifying means to allow a portion of the energy of said pulse pair to recirculate through said delay unit and said second amplifying means, means to extract from the output of said delay unit a portion of the energy of the recirculated pulses to obtain sequentially spaced pulse pairs with respect to the pulse pair input, third amplifying means to amplify said output of said delay unit, means utilizing said timing pulse to also synchronize said oscillator means, and means combining said delayed multifrequency pulse with said oscillator pulse output to derive therefrom a pulse of undulations of said given frequency only and of a pulse width equal to the width of said multifrequency pulse.

7. A circuit for obtaining a multifrequency pulse from a given pulse of undulations of a given high frequency and a given pulse width, comprising means to convert said given pulse into another pulse of a lower frequency but of the same pulse width as said given pulse, amplifier means to amplify said converted pulse, a delay unit adapted to operate at said lower frequency and having a delay equal to said width of said given pulse, means coupling said delay unit to the output and input of said amplifier, means to allow a portion of the energy of said converted pulse to recirculate through said delay unit and said amplifying means, means to combine said converted pulse and the recirculated portions to obtain a stretched pulse of said lower frequency having a pulse width equal to a multiple of the width of said given pulse depending upon the number of times of recirculation, means to convert said stretched pulse of said lower frequency into a stretched pulse of said given frequency, oscillator means to generate a pulse of undulations of sequentially different frequencies and having the same pulse width as said stretched pulse, means to synchronize said oscillator to produce an oscillator pulse having a leading edge in synchronism with the leading edge of said stretched pulse, and means to combine said stretched pulse with said oscillator pulse to obtain a multifrequency pulse having a width equal to the width of said given pulse.

8. In combination, a source of pulse pairs, each of said pulse pairs comprising a timing pulse and a multifrequency pulse of a given width, first amplifying means to amplify said pulses, a delay unit having a delay longer than the time interval which includes said pulse pair, means to couple said delay unit to the output and input of said first amplifying means to allow a portion of the energy of said pulses to recirculate through said delay unit and said first amplifying means, means to extract from the output of said delay unit a portion of the energy of the recirculated pulses to obtain sequentially spaced pulses with respect to each pulse pair input, second amplifying means to amplify said output of said delay unit, oscillator means to generate an oscillator pulse of undulations varying throughout a band of frequencies and having a pulse duration longer than the width of said multifrequency pulse, means utilizing said timing pulse to synchronized said oscillator means, means combining said delayed multifrequency pulse with said oscillator pulse to derive therefrom a pulse of undulations of a single frequency and having a pulse width equal to the width of said multifrequency pulse.

9. A radio repetitive pulse system for deriving a plurality of radio frequency pulses corresponding in frequency to the frequency of a received radio frequency pulse of a given frequency, each of said plurality of pulses being delayed in time with respect to each other and said received pulse, comprising a radio frequency pulse receiver, means to convert a received pulse of high frequency into another pulse of a lower frequency but of the same pulse width as said received pulse, first amplifying means to amplify said converted pulse, a delay unit adapted to operate at said lower frequency and having a delay equal to said width of said received pulse, means coupling said delay unit to the output and input of said amplifier, means to allow a portion of the energy of said converted pulse to recirculate through said delay unit and said first amplifying means, means to combine said converted pulse and the recirculated portions thereof to obtain a stretched pulse of said lower frequency having a minimum pulse width equal to a multiple of the width of said received pulse depending upon the number of times of recirculation, means to convert said stretched pulse of said lower frequency into a stretched pulse of said given frequency, oscillator means to generate a pulse of undulations of sequentially different frequencies and having the same pulse width as the minimum width of said stretched pulse, means to synchronize said oscillator to produce an oscillator pulse having a leading edge in synchronism with the leading edge of said stretched pulse, means to combine said stretched pulse with said oscillator pulse to obtain a first multifrequency pulse having a width equal to the width of said received pulse, means to derive from said received pulse a timing pulse, means to combine said timing pulse with said first multifrequency pulse to form a pulse pair, second amplifying means to amplify said pulse pair, a delay unit having a delay longer than the time interval which includes said pulse pair, means to couple said delay unit to the output and input of said second amplifying means to allow a portion of the energy of said pulses to recirculate through said delay unit and said second amplifying means, means to extract from the output of said delay unit a portion of the energy of the recirculated pulses to obtain sequentially spaced pulse pairs with respect to the pulse pair input, third amplifying means to amplify said output of said delay unit, means utilizing said timing pulse to also synchronize said oscillator means, means combining said delayed multifrequency pulse with said oscillator pulse to derive therefrom a pulse of undulations of said given frequency and having a pulse width equal to the width of said multifrequency pulse, and means to transmit each of said delayed pulses of said given frequency.

* * * * *